United States Patent
Xi et al.

(10) Patent No.: US 8,147,995 B2
(45) Date of Patent: Apr. 3, 2012

(54) PATTERNED MEDIA BITS WITH CLADDING SHELL

(75) Inventors: Haiwen Xi, Prior Lake, MN (US); Kaizhong Gao, Eden Prairie, MN (US); Song S. Xue, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 103 days.

(21) Appl. No.: 12/496,505

(22) Filed: Jul. 1, 2009

(65) Prior Publication Data

US 2010/0033872 A1 Feb. 11, 2010

Related U.S. Application Data

(60) Provisional application No. 61/086,479, filed on Aug. 6, 2008.

(51) Int. Cl.
*B44C 1/22* (2006.01)
*G11B 5/66* (2006.01)

(52) U.S. Cl. ........ 428/828; 428/836; 360/135; 427/129; 216/22

(58) Field of Classification Search .................. None
See application file for complete search history.

(56) References Cited

U.S. PATENT DOCUMENTS

| | | | |
|---|---|---|---|
| 6,579,634 B2 * | 6/2003 | Saito | 428/845.5 |
| 6,972,046 B2 * | 12/2005 | Sun et al. | 75/348 |
| 2006/0040140 A1 * | 2/2006 | Kaizu et al. | 428/829 |
| 2008/0180839 A1 * | 7/2008 | Mochizuki et al. | 360/125.03 |
| 2009/0161254 A1 * | 6/2009 | Ishio et al. | 360/110 |
| 2009/0166184 A1 * | 7/2009 | Zhou et al. | 204/192.11 |
| 2009/0214895 A1 * | 8/2009 | Hinoue et al. | 428/827 |
| 2010/0021768 A1 * | 1/2010 | Sonobe et al. | 428/829 |

FOREIGN PATENT DOCUMENTS

JP 2001256630 A * 9/2001

OTHER PUBLICATIONS

JPO Abstract Translation of JP 2001-256630 A (Pat-No. JP02001256630A)—Patent published Sep. 21, 2001.*
"Recording on Bit-Patterned Media at Densities of 1 Tb/in$^2$ and Beyond", H. J. Richter et al., IEEE Transactions on Magnetics, vol. 42, No. 10, Oct. 2006, pp. 2255-2260.

* cited by examiner

*Primary Examiner* — Kevin Bernatz
(74) *Attorney, Agent, or Firm* — Ladas & Parry, LLP

(57) ABSTRACT

A bit patterned media (BPM) includes many magnetic dots arranged in tracks on a substrate. The magnetic dots each have a hard magnetic core, a soft magnetic cladding surrounding the core and a thin non-magnetic layer that separates the hard magnetic core from the soft magnetic ring. The soft magnetic cladding stabilizes the magnetization at the edges of the hard magnetic core to improve the signal to noise ratio of the magnetic dots. The soft magnetic rings also narrow the magnetic field of the dots which reduces the space requirements and allows more dots to be placed on the substrate.

20 Claims, 7 Drawing Sheets

PATTERNED MEDIA BITS WITH CLADDING SHELL

CROSS REFERENCE TO RELATED APPLICATIONS

This application claims priority to U.S. Provisional Patent Application No. 61,086,479, Bit Patterned Media with Cladding Shell, filed Aug. 6, 2008, which is hereby incorporated by reference.

FIELD OF INVENTION

The present invention related to the manufacture of magnetic disks and, more particularly, bit patterned media (BPM) used in hard disc drives.

BACKGROUND

Designers, manufacturers, and users of electronic computers and computing systems require reliable and efficient equipment for storage and retrieval of information in digital form. Conventional storage systems, such as magnetic disk drives, are typically utilized for this purpose and are well known in the art. However, the amount of information that is digitally stored continually increases, and designers and manufacturers of magnetic recording media work to increase the storage capacity of magnetic disks.

In conventional magnetic disk data storage, the data is stored in a continuous magnetic thin film overlying a substantially rigid, non-magnetic disk. A magnetic recording layer that is a thin film of a magnetic alloy is formed on a disk. The recoding layer has a random mosaic of magnetic grains that behave as independent magnetic elements. Each bit of data is stored by magnetizing a small area of the thin magnetic film using a magnetic transducer (write head) that provides a sufficiently strong magnetic field to effect a selected alignment of the small area (magnetic grain) of the film. The magnetic moment, area, and location of the small area comprise a bit of binary information which must be precisely defined in order to allow a magnetic read head to retrieve the stored data/information. The disk may also include a soft magnetic underlayer that helps to concentrate the magnetic flux underneath the write pole of the head to increase the write field efficiency.

As technological improvements are made the areal data density of the disks increase. However, it is generally accepted that the conventional PMR film media has a maximum areal density between 500 Gbit/in$^2$ to 1 Terabit/in$^2$. In order to exceed this areal density limitation, various possible solutions are being developed including: Heat Assisted Magnetic Recording (HAMR), Microwave Assisted Magnetic Recording (MAMR) and bit-patterned media (BPM).

BPM is a promising technology that is likely to be commercialized in the next decade. Rather than a continuous magnetic recording layer film, BPM includes many small uniform magnetic "islands" or "dots" that are circular in shape and physically separated from each other on the disk media. The dots each include vertically oriented magnetic grains that are magnetically coupled together and behave like a large, single magnetic grain. Each of the magnetic dots constitutes a discrete magnetic domain or bit that is magnetized in a perpendicular or vertical manner to the disc either up or down. The magnetic dots are arranged in an array of circular tracks on the disk. FIG. 1 illustrates an exemplary recording disk 16 comprising an array of magnetic islands or dots 108. The bit pattern 50 includes a plurality of separate and discrete magnetic recording dots 52 organized into a staggered bit pattern. Each magnetic island or dots 108 is capable of storing a single bit of information. The areal density is increased because each bit of stored data corresponds to a pre-determined dot 108.

A potential problem with BPM is that magnetic moments at the edges of the magnetic dots can cause the dot to be unstable. This magnetization instability is noise that reduces the signal to noise ratio (SNR) of the dots and a low SNR increases the likelihood of disk malfunctions such as read or write errors. The magnetic instability at the edge of the dots is also one of the primary sources of media switching field distributions. What is needed is an improved magnetic element design that improves the stability of the magnetic dots.

SUMMARY OF THE INVENTION

The present invention is directed towards bit-patterned media (BPM) that has an improved magnetic element structure that improves the magnetic stability. As discussed in the background, BPM uses magnetic islands or dots that include vertically oriented magnetic grains. In order to improve the magnetic moment stability at the edges of the dots, a special magnetic element design is used.

On the inventive BPM disk, the magnetic islands or dots are preferably thin circular structures that are formed on a flat disk substrate. The center portions of the dots are cores made of hard magnetic material that are thin circular structures that have cylindrical perimeters. The perimeter of the hard magnetic core is surrounded by a soft magnetic cladding and a thin non-magnetic spacer separates the hard magnetic core from the soft magnetic cladding forming a type of core-shell structure.

The soft magnetic rings stabilize the magnetic moments at the edges of the hard magnetic cores. The magnetization direction of the hard magnetic core is perpendicular to the disk plane and can either be up or down. The data bits are recorded to the hard magnetic cores by a perpendicular write field. A magnetization direction up away from the substrate may correspond to a logical "one" and conversely, a magnetization direction down towards the substrate may correspond to a logical "zero." The soft magnetic cladding is antiferromagnetically coupled to the hard magnetic core. In response to the magnetic field of the hard magnetic core, the soft magnetic cladding is magnetized in an opposite direction. Thus, if the core is magnetized up for a logical one, the soft magnetic cladding is magnetized down and conversely, if the core is magnetized down for a logical zero, the soft magnetic cladding is magnetized up. This antiferromagnetically coupling of the cores and soft magnetic rings stabilizes the magnetic moments at the outer edges of cores.

Since the magnetic fields of the core and the soft magnetic cladding are in opposite directions, the soft magnetic cladding will reduce the magnetic field strength of the core. Because the soft magnetic cladding surrounds the perimeter of the core, the magnetic field strength is decreased more at the perimeter and less at the center of the magnetic island or dot. The magnetic field strength is highest at the center of the hard magnetic core and the magnetic field strength drops more quickly at points farther away from the center of the core.

In an embodiment, the BPM disk is part of a magnetic storage device. The magnetic storage device also comprises a data recording head for directing a magnetic field at the BPM disk, and an actuator supporting and positioning the data recording head with respect to the BPM disk to effect data recording. The BPM disk comprises a substrate and a magnetic layer supported by the substrate, wherein the magnetic layer comprises an array of discrete and separated data dots. Each dot comprises a hard magnetic core antiferromagnetically coupled with a soft magnetic cladding and a thin non-magnetic layer that separates the core from the soft magnetic cladding.

This narrower magnetic field profile provides a sharper magnetic field signal that makes it easier for a read head to detect the magnetic field direction of the magnetic islands or dot. When a read head is passed over a dot, it must determine if the dot is a logical one or zero. A sharp change in the magnetic field is more easily read by the read head than a gradual change over a wider area. The narrower magnetic field profile can also reduce the interference between data bits, reduce the crosstalk, and enhance the thermal stability of the magnetic dots. The narrower magnetic fields can also allow the magnetic dots to be placed closer together further increasing the areal density.

A method of manufacturing a patterned storage media is also provided. The manufacturing method comprises a sequence of steps needed to fabricate the BPM disk. A seed layer is deposited on a substrate and a hard magnetic film is deposited on the seed layer. The hard magnetic film is patterned into an array of cores and the magnetic film and seed layer between the cores is removed. A thin non-magnetic layer is deposited over the hard magnetic cores and around the lateral sides of the cores. A soft magnetic layer is deposited upon over the non-magnetic layer. The portions of the soft magnetic layer between the hard magnetic cores are removed through an etching process. A non-magnetic material is then deposited onto the substrate over and between the cores. The substrate is then planarized to remove the non-magnetic material and soft magnetic material over the hard magnetic cores. A non-magnetic protective layer can be deposited over the exposed hard magnetic cores and soft magnetic rings. The resulting substrate has an array of hard magnetic cores that are surrounded by soft magnetic claddings and non-magnetic rings that separates the hard magnetic cores from the soft magnetic claddings.

These and various other features and advantages will be apparent from a reading of the following detailed description.

DETAILED DESCRIPTION

Bit patterned magnetic media ("BPM") has been proposed as a means for increasing areal density. The term "BPM" generally refers to magnetic data/information storage and retrieval media wherein a plurality of discrete, independent regions of magnetic material which form discrete, independent magnetic islands or dots that function as recording bits are formed on a non-magnetic substrate. Since the regions of ferromagnetic material comprising the magnetic bits or elements are independent of each other, mutual interference between neighboring bits can be minimized. As a consequence, bit patterned magnetic media has reduced recording losses and noise arising from neighboring magnetic bits compared to known continuous magnetic media.

In general, each magnetic island or dot has the same size and shape, and is composed of the same magnetic material as the other elements. The magnetic dots are illustrated and described as circles in the application. However, the dots do not necessarily have to be circles. In other embodiment, the magnetic dots can be with shape of square and rectangle, etc.

The magnetic islands or dots are arranged in a regular pattern over the substrate surface, with each element having a small size and desired magnetic anisotropy, so that, in the absence of an externally applied magnetic field, the magnetic moments of each discrete magnetic dot will be aligned along the same magnetic easy axis. The BPM comprised dots, with perpendicularly oriented magnetic axis are advantageous in achieving higher areal recording densities. The magnetic moment of each discrete magnetic dot has two possible states: magnetization up away from the disk may correspond to a logical "one" and a magnetization down towards the disk may correspond to a logical "zero." These states are the same in magnitude but aligned in opposite directions. Each discrete magnetic dot forms a single magnetic domain or bit and the size, area, and location of each domain is determined during the fabrication process.

Figure 1:
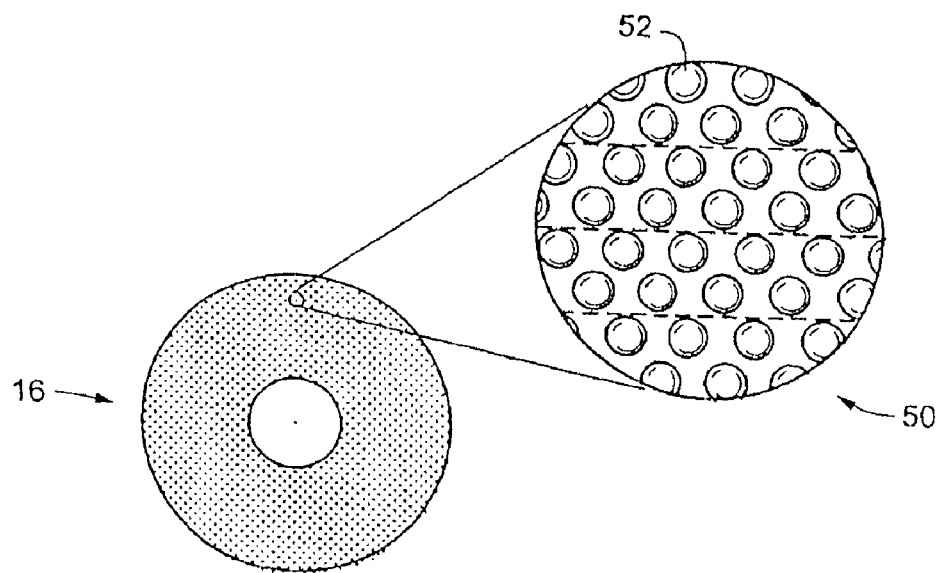
FIG. 1 is a top view of individual bit cells in a bit-patterned media disk.
Figure 2:
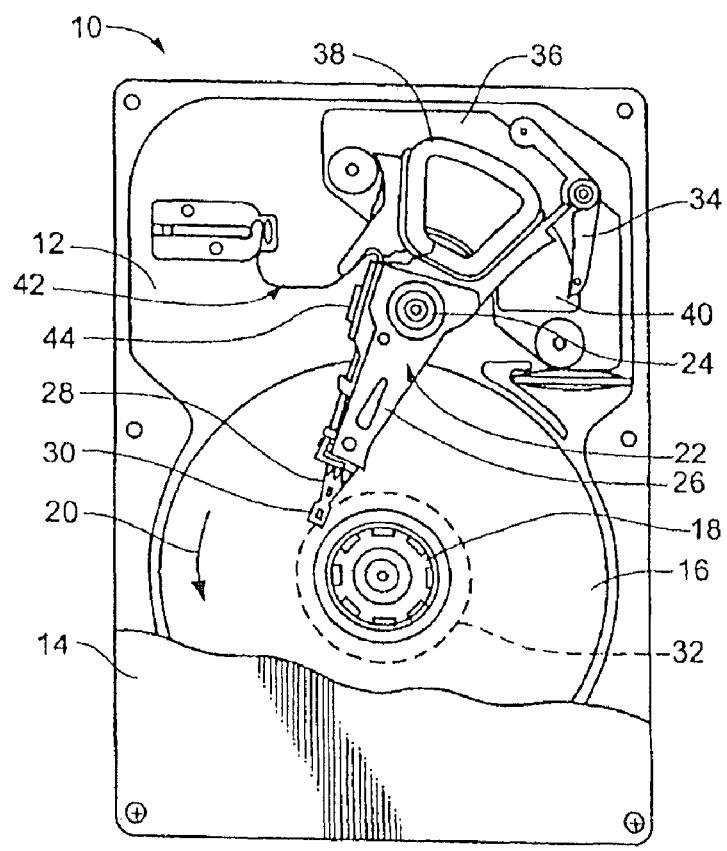
FIG. 2 is a top plane view of a magnetic storage device in an embodiment of the present invention.

FIG. 2 is a top view of a magnetic storage device in an embodiment of the invention. As shown, the device is a magnetic recorder 10, and takes the form of a disk drive of the type used to interface with a host computer to magnetically store and retrieve data. The disk drive includes various components that are mounted to a base 12. A top cover 14 which is shown in a partial cutaway fashion is coupled to the base 12 to form an internal, sealed environment for the disk drive.

The magnetic recorder 10 includes magnetic storage media for recording data. In the embodiment shown in FIG. 2, the media takes the form of a plurality of axially-aligned, magnetic recording disks 16 mounted to a spindle motor 18 for rotating at a speed in a rotational direction 20. An actuator 22, which rotates about a bearing shaft assembly 24 positioned adjacent the disks 16, is used to write and read data to and from tracks on the disks 16.

The actuator 22 includes a plurality of rigid actuator arms 26. Flexible suspension assemblies 28 are attached to the distal end of the actuator arms 26 to support a corresponding array of read and/or write head transducers 30 with at least one transducer head adjacent to each disk surface. Each transducer 30 includes a slider assembly designed to fly in close proximity to the corresponding surface of the associated disk 16. Upon deactivation of the disk drive 10, the transducers 30 come to rest on an outer stop 32 and a magnetic latch 34 secures the actuator 23.

A voice coil motor (VCM) 36 is used to move the actuator 22 and includes an actuator coil 38 and permanent magnet 40. Application of current to the coil 38 induces rotation of the actuator 22 about the pivot assembly 24. A flex circuit assembly 42 provides electrical communication paths between the actuator 22 and a disk drive printed circuit board assembly (PCBA) mounted to the underside of the base 12. The flex circuit assembly 42 includes a preamplifier/driver circuit 44 which applies currents to the transducers 30 to read and write data.

During writing operation of patterned media, the direction of the magnetic moment of the single magnetic dot or bit is flipped along the perpendicular vertical axis by the write head 30, and during reading operation, the direction of the magnetic moment of the single magnetic domain element or bit is sensed by the read head 30. A problem with BPM is that the magnetic moments at the edges and the lateral sides of the magnetic dots are not stable. These fluctuations in the magnetic moments can affect the signal-to-noise rate and possibly the stability of the stored data. In order to overcome these stability problems, the inventive patterned media dots have a specific structure that includes a hard magnetic core that is surrounded by a soft magnetic cladding and a thin non-magnetic layer that separates the hard magnetic core from the soft magnetic cladding.

Figure 3:
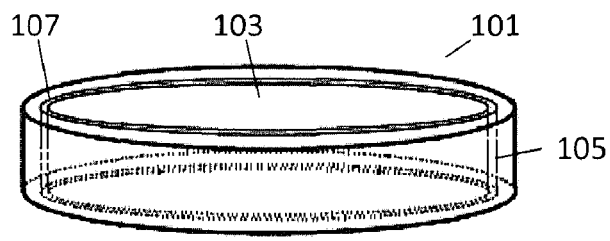
FIG. 3 is a perspective view of a magnetic element of a BPM having a soft magnetic cladding.
Figure 4:
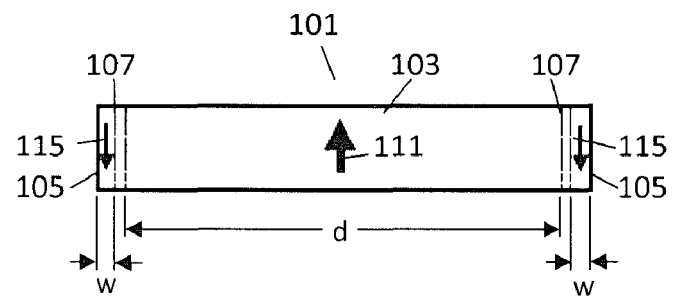
FIG. 4 is a side view of a magnetic element.
Figure 5:
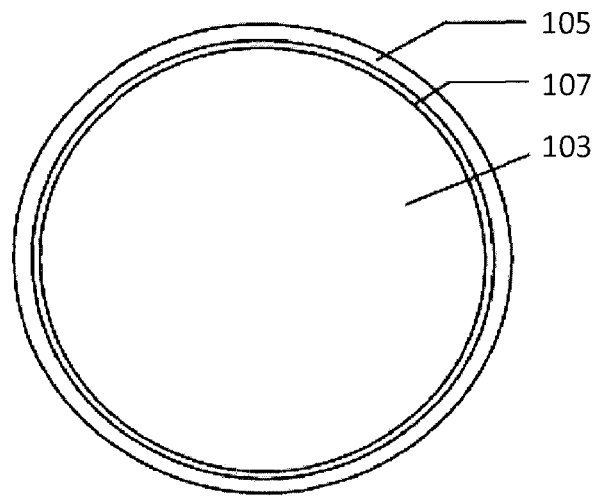
FIG. 5 is a top view of a magnetic element.

With reference to FIGS. 3-5, a single magnet island or dot 101 is illustrated. The magnet dot 101 includes a hard magnetic core 103, a thin magnetically soft cladding 105 that surrounds the perimeter of the hard magnetic core 103. The hard magnet core 103 and the soft magnet cladding 105 are separated by a thin non-magnetic layer 107. The hard magnetic core 103, non-magnetic layer 107 and soft magnetic cladding 105. This inventive magnetic dot 101 structure forms a type of core-shell structure.

The magnetic materials in the hard magnetic element 101 are arranged to produce a magnetic field that is perpendicular to the substrate either up or down. The hard magnetic core 103 and the soft magnetic cladding 105 are antiferromagnetically coupled, so the soft magnetic cladding 105 assumes a magnetic direction that is in the opposite direction of the hard magnetic core. The antiferromagnetic coupling with the soft cladding 105 stabilizes the magnetic moments at the edge of the hard magnetic core 103. With reference to FIG. 4, the arrow 111 indicates the direction of the magnetic field of the hard magnetic core 103 and the arrows 115 indicate the direction of the magnetic field of the soft magnetic cladding 105. Since the magnetic field arrow 111 for the hard magnetic core 103 is pointing up, the magnetic field arrows 115 for the antiferromagnetically coupled soft magnetic cladding 105 are pointing down in the opposite direction.

The thickness of the magnetic core 103, the non-magnetic layer 107 and the soft magnetic cladding 105 are preferably uniform as shown in FIG. 4. The thickness of the magnetic element 101 is preferably less than 10 nanometers (nm). With reference to FIG. 5, a top view of the hard magnetic core 103, non-magnetic layer 107 and soft magnetic cladding 105 are illustrated. In a preferred embodiment, the hard magnetic core 103 is circular and the diameter of the hard magnetic core 103 is preferably less than 20 nm. The width of the soft magnetic cladding 105 is preferably less than 5 nm. The width of the non-magnetic layer 107 is very thin, preferably less than 1 nm.

Figure 6:
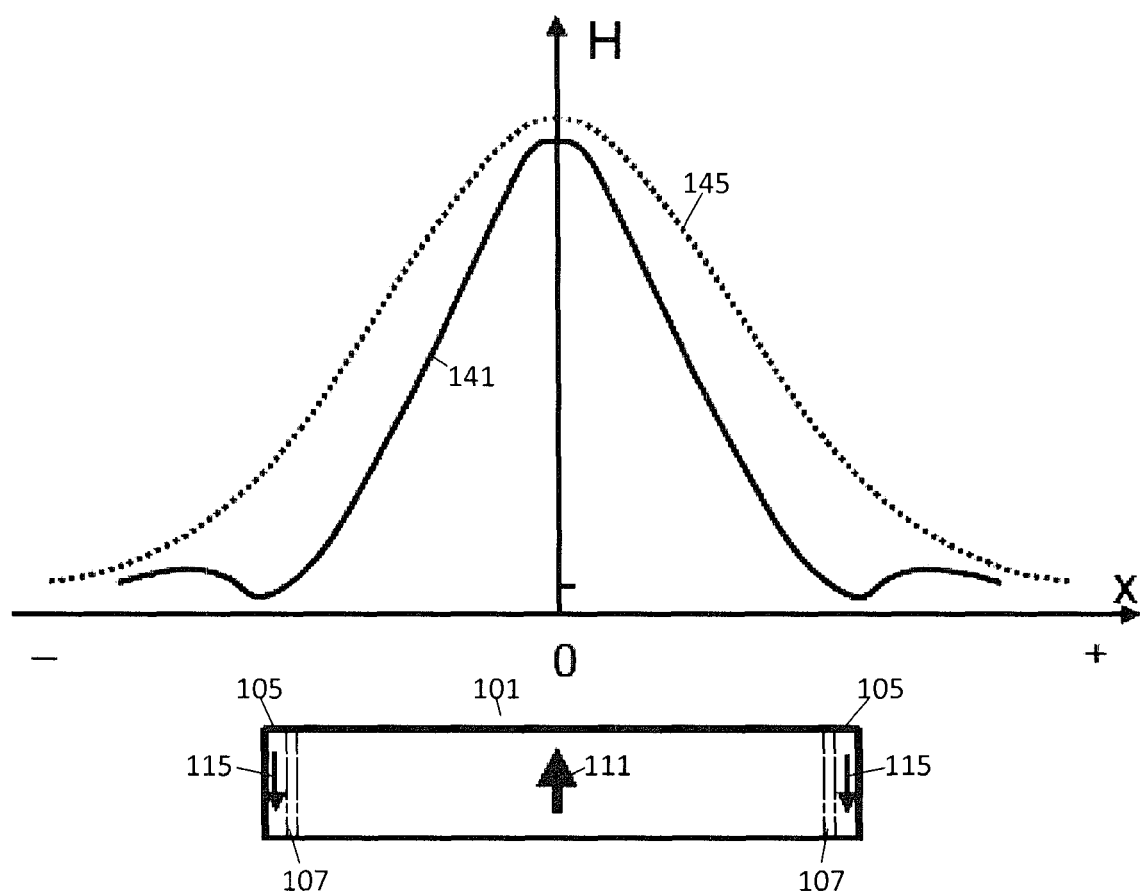
FIG. 6 is a graph showing the magnetic field strength across the width of the magnetic element.

With reference to FIG. 6, the perpendicular component (H) of the magnetic field from the patterned media bit is shown as a function of the location in the disk plane. In this example, since the media bit is circular and symmetric about the center, the perpendicular component of the magnetic field is also symmetric about the center line. The hard magnetic core 103 is magnetized up in a logical one state as indicated by arrow 111 and the soft magnetic cladding 105 is magnetized down as indicated by arrows 115. The solid line 141 shows the perpendicular magnetic field component H for a hard magnetic core 103 with a soft magnetic cladding 105 and for comparison, the dotted line 145 indicates the perpendicular magnetic field component without the soft magnetic cladding 105.

The magnetic field signal strength of the core 103 is equal to the thickness of the magnetic material times the magnetization strength as illustrated by the dotted line 145. Since the soft magnetic cladding 115 is magnetized in the opposite direction, the magnetic field of the dot is reduced as illustrated by the solid line 141. Thus, the opposite magnetic field 115 of the soft magnetic cladding 105 is quantified by the difference between the dotted line 145 and the solid line 141. Like the hard magnetic core 103, the opposite magnetic field strength is greatest directly over the soft magnetic cladding 105 and the field strength tapers off in proportion to the distance from the soft magnetic cladding 105.

Since the soft magnetic cladding 105 is magnetized in the opposite direction, the perpendicular component H of the maximum field strength 145 is slightly reduced in comparison to a single hard magnetic core 141 alone. The soft magnetic cladding 105 also causes the field spatial profile to be narrower. The field strength H decreases faster with the distance from the center of the hard magnetic core 103. The field strength H is also much lower beyond the outer perimeter of the dot 101 meaning that the interaction, interference and cross talk between the adjacent patterned media dots 101 is also reduced. Furthermore, since the field profile from the patterned media bit is narrower, the magnetic dots 101 can be arranged with a higher areal density on the substrate.

With reference to FIG. 3, in a preferred embodiment, there is a relationship between the diameter (d) of the hard magnetic core 103 and the horizontal width (w) of the soft magnetic cladding 105. The width (w) of the soft magnetic cladding 105 is preferably about 5% to 25% of the diameter (d) of the hard magnetic element 103 to stabilize the magnetic moment at the edges of the hard magnetic core 103. If the width (w) is less than 5% of the thickness (t), the antiferromagnetic coupling can be too small to stabilize the edges of the hard magnetic core 103. In contrast, if the width (w) of the soft magnetic cladding 105 exceeds 20%, the cumulative magnetic field strength H of the dot 101 can be excessively reduced and the dot 101 may not have a sufficient magnetic field strength H. Be keeping the width (w) of the soft magnetic cladding 105 between about 5% to 25% of the diameter (d) of the hard magnetic core 103, the field strength H is easily readable and the magnetic fields at the edges of the hard magnetic cores 103 are stable.

Figure 7:
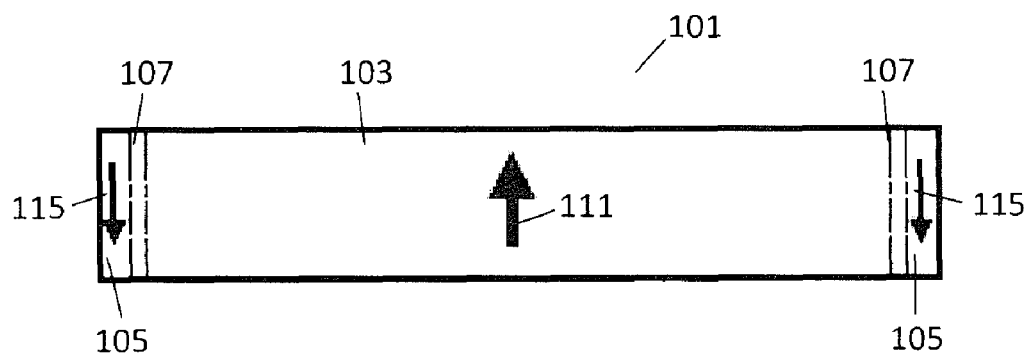
FIG. 7 is a side view of a magnetic element of a BPM.
Figure 8:
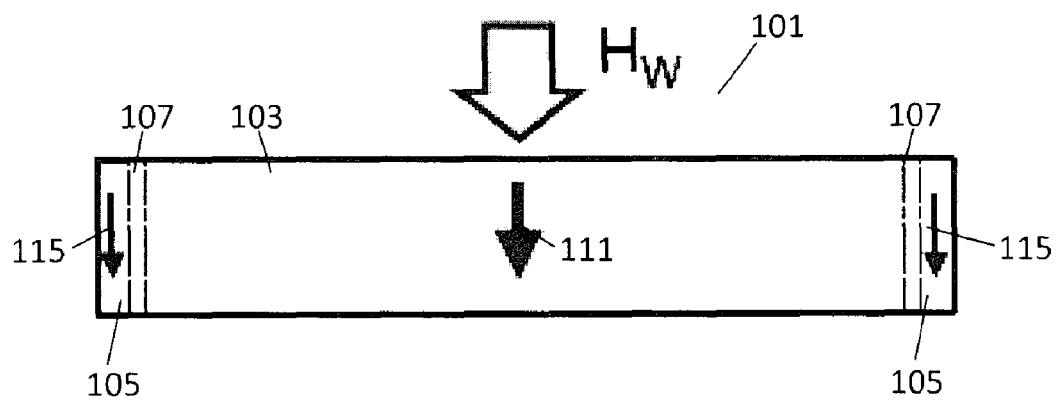
FIG. 8 is a side view of a magnetic element exposed to a magnetic recording field.
Figure 9:
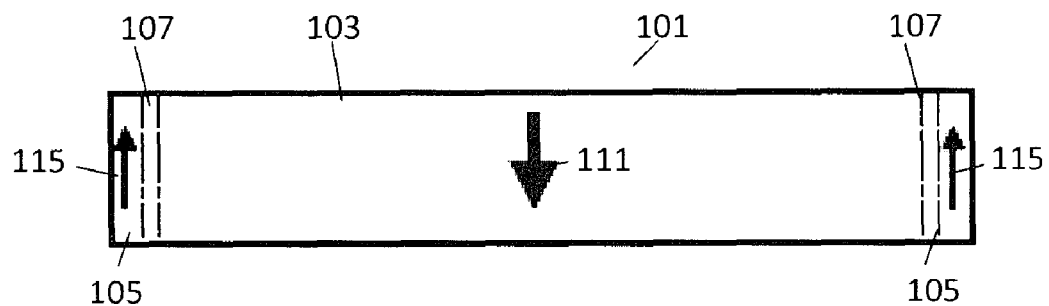
FIG. 9 is a side view of a magnetic element after being recorded.

FIGS. 7-9 show the write process as a write head records data onto a magnetic dot 101 on the proposed side-coupled hard magnetic elements and soft magnetic rings. With reference to FIG. 7, the hard magnetic core 103 may normally have a magnetization pointing up 111 away from the substrate. Since the soft magnetic cladding 105 is antiferromagnetically coupled, the magnetization 115 is in the opposite direction facing down. With reference to FIG. 8, when a down magnetic write field Hw is applied on a dot 101 with an up magnetization direction, the magnetization direction of the hard magnetic element 101 is reversed and points down. The magnetization direction 115 of the soft magnetic cladding 105 initially points down with the down magnetic write field Hw. With reference to FIG. 9, when the down magnetic write field Hw is removed, the soft magnetic cladding 105 is antiferromagnetic coupled to the down magnetization direction 111 of the hard magnetic core 103. The coupling causes the magnetization direction 115 of the soft magnetic cladding 105 to switch to an up direction opposite the magnetic field direction 111 of the hard magnetic core 103.

A specific sequence of process steps are required to fabricate magnetic dots that have hard magnetic cores and soft magnetic rings on a substrate. FIGS. 10-15 illustrate an example of the process steps used to form the side-clad magnetic elements. In other embodiments, the inventive BPM disc can be made by various other methods and fabrication steps. A seed layer 309 is deposited on the substrate 301 and a hard magnetic material layer 303 is deposited over the seed layer 309. The seed layer 309 can comprise a face center cubic (fcc) material selected from the group consisting of: alloys of Cu, Ag, Pt, and Au, or a material selected from the group consisting of: Ta, TaW, CrTa, Ti, TiN, TiW, or TiCr. The hard magnetic layer 303 can be made of a ferromagnetic material that comprises at least one ferromagnetic element and at least one additional element. Preferably, the ferromagnetic element is selected from the group consisting of Fe, Co, and Ni and the additional element(s) is selected from the group consisting of Al, Si, Ti, V, Cr, Zr, Nb, Mo, Ru, Rh, Pd, Ag, Hf, Ta, W, Re, Ir, Pt, and Au. Examples of suitable hard magnetic core 303 materials include: CoPt, FePt, and CoCrPtB. The hard magnetic material has a relatively high coercivity, typically about 3-8 kOe, and perpendicular anisotropy.

Figure 10:
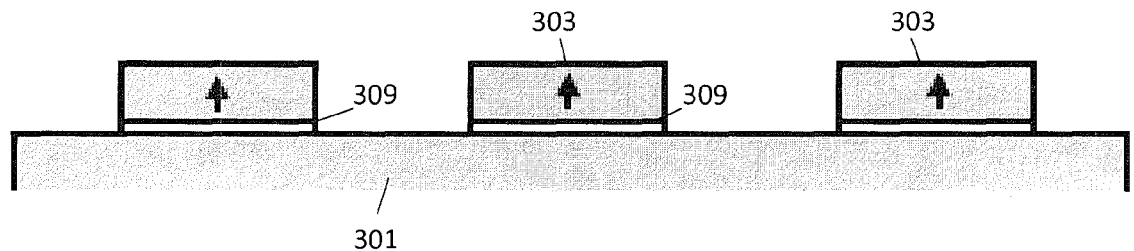
FIG. 10 is a view of a substrate with hard magnetic cores.
Figure 11:
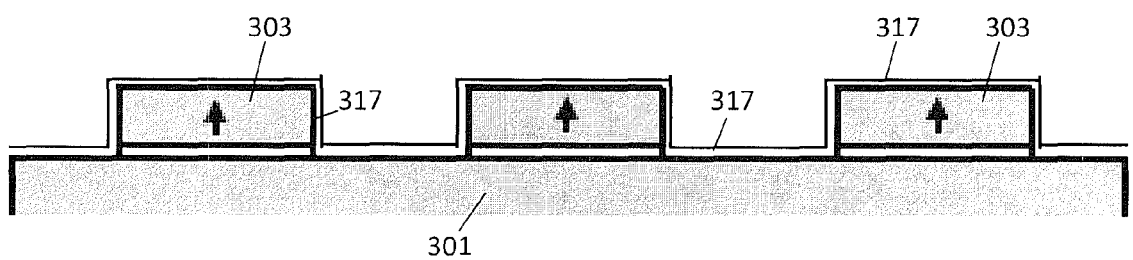
FIG. 11 is a view of the substrate after a spacer material has been deposited.

With reference to FIG. 10, the hard magnetic layer 303 and seed layer 309 are patterned and etched to form hard magnetic cores 303 on the substrate 301. The deposition can be performed by electroplating, sputtering, physical vapor deposition (PVD), chemical vapor deposition (CVD), plasma enhanced (PECVD), atomic layer deposition (ALD), thin film deposition, etc. The patterning of the cores 303 can be through a UV-cure nanoimprint lithography which replicates a topographic pattern from a master mold into a polymeric resist coating on a disk substrate. The resist coating is cured and the patterned substrate is etched with reactive ion etching (RIE) or any other suitable etch process. Nanopatterning systems are available from Molecular Imprints of Austin Tex.

With reference to FIG. 11a thin layer of non-magnetic spacer material 317 is deposited over the substrate 301 covering the tops and side perimeters of the hard magnetic cores 313 and the other exposed surfaces. The non-magnetic spacer material 317 can be a non-magnetic conductive metal such as ruthenium and copper or a non-magnetic dielectric material such as a metal oxide. Examples of non-magnetic dielectric materials include aluminum oxide ($Al_2O_3$), silicon dioxide ($SiO_2$), $SiO_xN_y$, and combinations thereof.

In an embodiment, ALD can be used to deposit the non-magnetic material 317. ALD reactions can use two chemical precursors that react with a substrate surface in a one-at-a-time sequential manner. The growth of the non-magnetic material layer through ALD consists of repeating the following steps: 1) exposing the substrate to the first precursor, 2) purging the reaction chamber to remove the non-reacted precursors and the gaseous reaction by-products, 3) exposing the second precursor and 4) purging of the reaction chamber. Each reaction cycle adds a specific amount of material to the surface. Thus, to grow a material layer, reaction cycles are repeated as many as required to deposit the desired film thickness. By exposing the substrate 301 to the precursors, a thin film of non-magnetic material 317 is deposited over the hard magnetic cores 313. In other embodiments, various other deposition processes can be used to deposit the non-magnetic spacer material 317 including: electroplating, sputtering, PVD, CVD, PECVD, thin film deposition, etc. In an embodiment the non-magnetic spacer material 317 can be Ruthenium or a metal oxide such as aluminum oxide.

Figure 12:
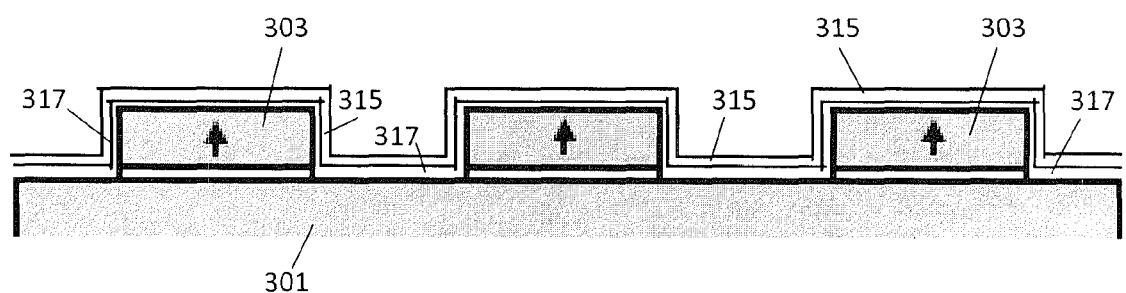
FIG. 12 is a view of the substrate after a soft magnetic material has been deposited.

With reference to FIG. 12, a soft magnetic layer 315 is deposited on the substrate 301 over the non-magnetic layer 317 and the hard magnetic cores 313. The soft magnetic layer 315 forms a shell over the hard magnetic cores 313 that is much thinner than the diameter of the hard magnetic cores 313 diameter. In an embodiment, the optimal horizontal width W can be about 5 to 25% of the hard magnetic core's diameter D if the magnetic moment of the soft magnetic cladding or shell and the magnetic moment of the core are the same. However, if the magnetic moments of the soft magnetic cladding or shell and the core are different, the relationship between the horizontal width W and the hard magnetic core's diameter D can be different. For example, when the magnetic moment of the soft magnetic cladding is higher than the magnetic moment of the core, the cladding thickness can be thinner.

The soft magnetic cladding material 315 can be deposited by: electroplating, sputtering, PVD, CVD, PECVD, ALD, thin film deposition, etc. The soft magnetic cladding material 315 can have a relatively low coercivity, typically not greater than about 1 kOe. Suitable soft magnetic materials 315 can be formed from alloys that include iron, cobalt, nickel and combinations thereof. Examples include: cobalt-iron (CoFe), nickel-iron (NiFe), nickel-cobalt-iron (NiCoFe) and other similar alloys.

Figure 13:
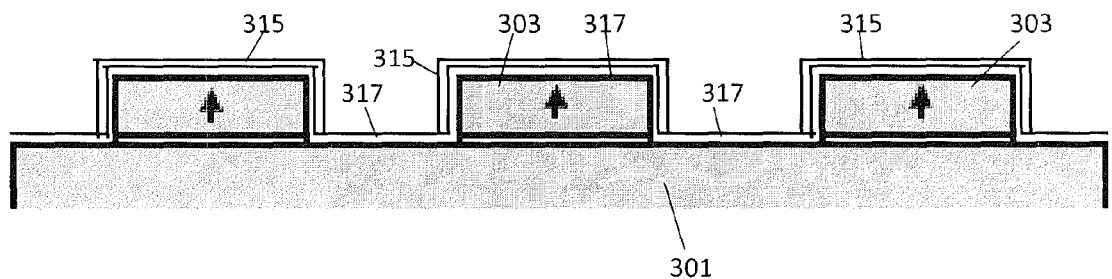
FIG. 13 is a view of the substrate after the soft magnetic material between the hard magnetic cores has been removed.

In FIG. 13, the soft magnetic layer 315 between the hard magnetic cores 313 is removed. The removal of the soft magnetic material from the areas between the magnetic cores 303 can be done through various etch processes, including ion milling or anisotropic etching of the horizontal soft magnetic material layer 315. If the etch process is material selective, the soft magnetic material 315 can be removed while the under laying non-magnetic layer 317 is not etched. Since the non-magnetic layer 317 is non-magnetic, it is not necessary to remove this material from the spaces between the hard magnetic cores 313. The non-magnetic layer 317 can function as a stop layer or it can be partially etched without any damage to the substrate 301.

In an embodiment, ion milling is used to etch the soft magnetic layer 315. Because ion milling is anisotropic, the horizontal soft magnetic material 315 between the cores 303 will be etched while the material on the sides of the cores 303 will not be etched. Ion milling is performed at lower pressures in a vacuum processing chamber. The substrate is bombarded with energetic ions of a noble gas, often $Ar^+$, which knock the soft magnetic atoms from the substrate by transferring momentum. In other embodiments, other types of anisotrpic etching can be used to remove the soft magnetic material including plasma etching and anisotropic wet etching.

Figure 14:
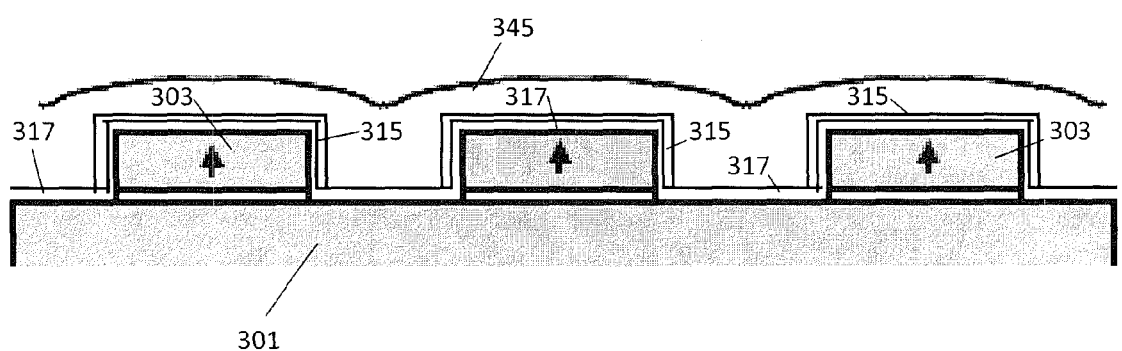
FIG. 14 is a view of the substrate after a non-magnetic material has been deposited onto the substrate.

With reference to FIG. 14, a layer of non-magnetic filler material 345 is deposited over the substrate 301 covering the hard magnetic cores 313 and the recessed areas between the cores 313. Various processes can be used to deposit the non-magnetic filler material 345 including: electroplating, sputtering, PVD, CVD, PECVD, ALD, thin film deposition, etc. The non-magnetic filler 345 can be a conductive or a non-conductive material. An example of a non-magnetic non-conductive filler material is a metal oxide such as aluminum oxide. The non-magnetic filler material 345 has similar physical properties to the hard magnetic core 313 material, such as density, thermal expansion, etc. This will result a smooth surface after CMP processing. In contrast, if non-uniform materials are used, the result can be an uneven surface profile after CMP. A flat surface is extremely critical in BPM. Because the non-magnetic filler 345 can be applied evenly over the substrate, the upper surface will not be planar and substrate thickness will be greater over the hard magnetic cores 313.

Figure 15:
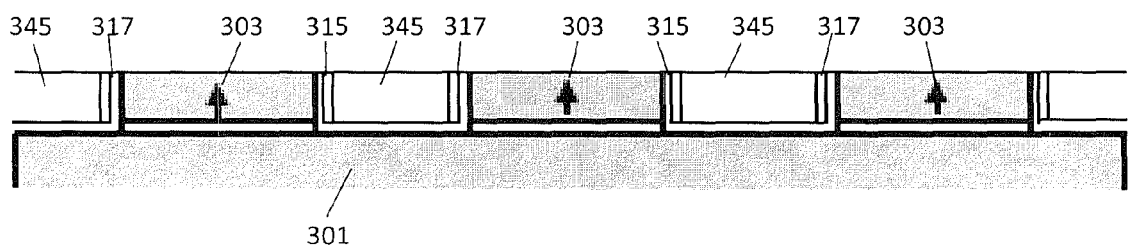
FIG. 15 is a view of the substrate after the layered structure has been planarized to expose the hard magnetic cores.

With reference to FIG. 15, the substrate 301 is planarized to remove the non-magnetic filler material 345, the soft magnetic material 315 and the non-magnetic spacer 317 layers from the tops of the hard magnetic cores 303. In an embodiment, the planarization process can be chemical mechanical planarization (CMP). The CMP process uses an abrasive chemical slurry in conjunction with a polishing pad to planarize a substrate. The substrate is mounted on a polishing head that rotates and presses the substrate against the rotating polishing pad as the slurry flows between them. The movement of the substrate 301 against the slurry and pad removes material from the substrate and tends to even out any irregular topography, making the substrate flat or planar. In other embodiments, different processes can be used to planarize the substrate 301.

After planarization, additional finishing processes are performed on the substrate 301. For example, in a preferred embodiment, a protective layer and a lubricant are applied to the substrate 301 covering the hard magnetic cores 303 and filler material 345. While a specific series of process steps are described, in other embodiments, various other processes can be used to fabricate the magnetic dots that include hard magnetic cores and soft magnetic claddings on the substrate.

Figure 16:
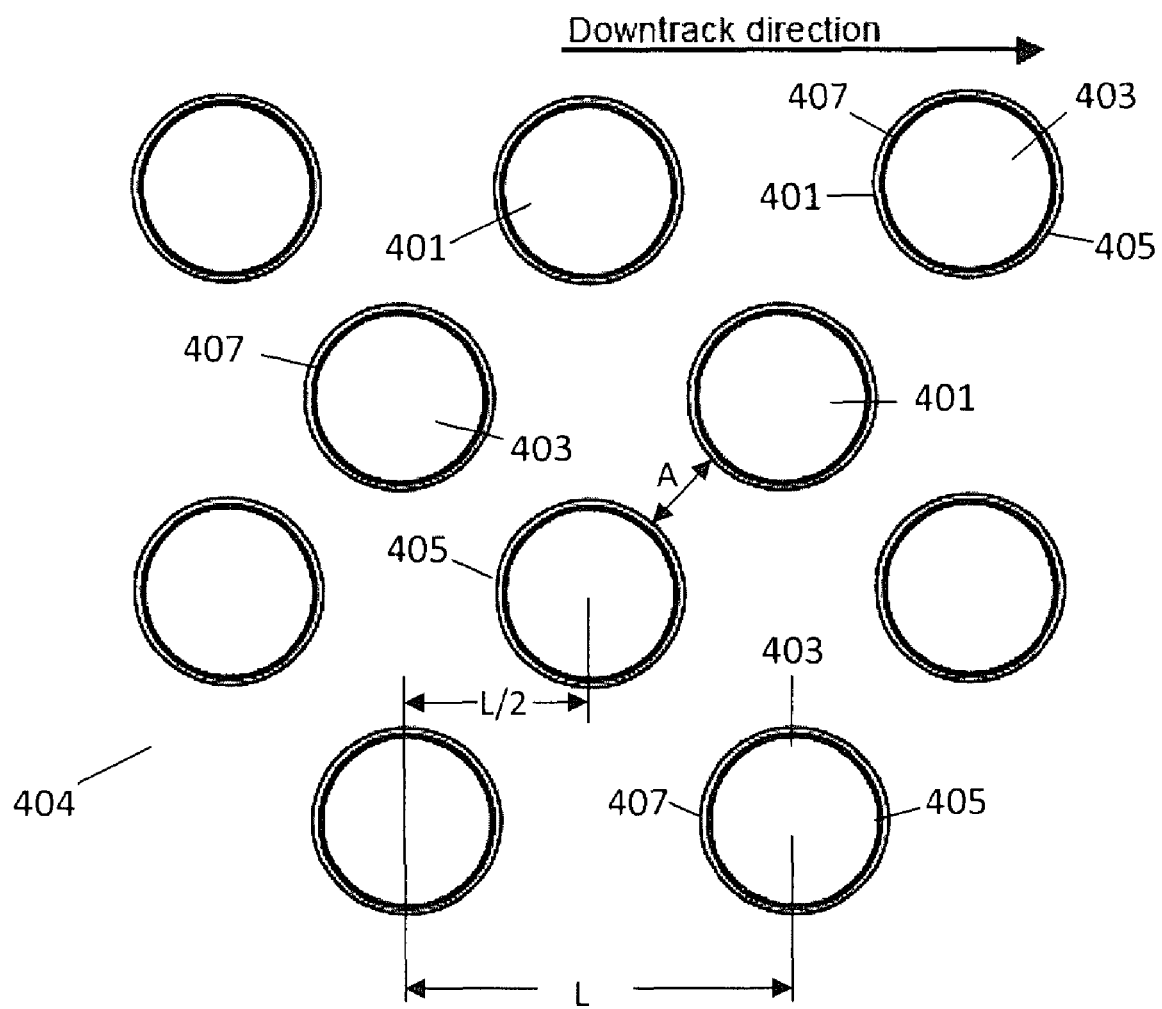
FIG. 16 is a top view of a portion of the substrate showing an arrangement of offset BPM bits in multiple tracks.

FIG. 16 is a top view of a portion of a BPM disk 404 having several hard magnetic dots 401 with hard magnetic cores 403, soft magnetic rings 405 and non-magnetic spacers 407 separating the hard magnetic cores 403 from the soft magnetic rings 405. The magnetic dots 401 are arranged into multiple tracks of run in a horizontal direction across the substrate 404 with the horizontal spacing L between the adjacent dots 401 being a substantially uniform distance. Rather than aligning the dots 403 both horizontally and vertically, the dots 401 in each of the adjacent horizontal tracks are offset. In this illustration, the magnetic dots 401 in one track are offset by one half L from the dots 401 in the adjacent tracks and the magnetic dots 401 in every other track are aligned.

A primary goal of the BPM is to improve the data density of the disk. In order to keep the magnetic data distinct, the dots 401 must be separated by a minimum distance "A." As discussed above with reference to FIG. 4, the inventive magnetic element structure has a narrower magnetic field which allows the elements to be placed closer together than magnetic elements that do not have the soft magnetic shell. By offsetting the dots 401 of the adjacent tracks by L/2, more dots 401 can be placed on an area of the disk and the areal density is improved. In an embodiment, each of the dots 401 can be separated from six surrounding adjacent dots 401 by the minimum separation distance, A.

In other embodiments, the magnetic dots 401 in the adjacent tracks can be offset by different distances. For example, the magnetic dots 401 in adjacent tracks can be offset by L/3, L/4, L/5, etc. The offset of the adjacent tracks can depend upon the width of the read head and write head. If the read/write head is two tracks wide, the head can be positioned over two tracks simultaneously and the two tracks are read or recorded simultaneously. In order to properly read or write data, the head should only be directly over one magnetic dot at any position. Thus, if the head is 5 tracks wide, the offset between the adjacent tracks should be L/5.

The foregoing discussion of the invention has been presented for purposes of illustration and description. The foregoing is not intended to limit the invention to the form or forms disclosed herein. In the foregoing description for example, various features of the invention have been identified. It should be appreciated that these features may be combined together into a single embodiment or in various other combinations as appropriate for the intended end use. The dimensions of the component pieces may also vary, yet still be within the scope of the invention. This method of disclosure is not to be interpreted as reflecting an intention that the claimed invention requires more features than are expressly recited in each claim. Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the flowing claims reflect, inventive aspects lie in less than all features of any single foregoing disclosed embodiment.

What is claimed is:

1. A magnetic storage device, comprising,
a plurality of spaced apart magnetic bits, each bit constituting a discrete magnetic domain on a planar surface, each bit comprises a hard magnetic core with an external surface, a non-magnetic spacer laterally in contact with the external surface of the core and a magnetically soft cladding surrounding the non-magnetic spacer wherein the non-magnetic spacer and the soft magnetic cladding are configured such that the hard magnetic core and the soft magnetic cladding are operable to anti-ferromagnetically couple with each other.

2. The magnetic storage device of claim 1 wherein the soft cladding includes a soft magnetic ring, the hard magnetic core has a circular cross section with a diameter, and the soft magnetic ring has a horizontal width is between 5% and 25% of the diameter of the hard magnetic core.

3. The magnetic storage device of claim 1 wherein the hard magnetic cores are circular in cross section and less than 20 nanometers in diameter.

4. The magnetic storage device of claim 1 wherein the soft cladding includes a soft magnetic ring having a horizontal width less than 2 nanometers.

5. The magnetic storage device of claim 1 wherein the non-magnetic spacers include ruthenium (Ru).

6. The device of claim 1 wherein the plurality of magnetic bits are arranged in a plurality of tracks on a substrate and the plurality of magnetic bits in one of the tracks are offset from the plurality of magnetic bits in an adjacent track.

7. The magnetic storage device of claim 1 wherein the hard magnetic cores each have a first magnetization direction perpendicular to the planar surface and each of the soft magnetic claddings have a magnetization direction perpendicular to the planar surface and opposite the first direction.

8. A method, comprising:
   on a planar surface of a substrate, forming a plurality of spaced apart magnetic bits, each bit comprising a hard magnetic core with a first magnetization direction perpendicular to the plane surface;
   forming a thin non-magnetic spacer layer around a lateral surface of each of the hard magnetic cores; and
   forming a soft magnetic cladding disposed around a lateral surface of each of the space layers, the magnetic cladding having a second magnetization direction perpendicular to the planar surface and opposite of the first direction.

9. The method of claim 8 further comprising:
   planarizing upper surfaces of the hard magnetic cores.

10. The method of claim 8, wherein the forming of the plurality of soft magnetic rings comprises depositing a layer of soft magnetic material onto the substrate and etching the soft magnetic material between the plurality of spaced apart hard magnetic cores.

11. The method of claim 10 wherein the etching is performed by ion milling.

12. The method of claim 8 wherein the forming the non-magnetic spacers includes depositing a layer of non-magnetic material onto the substrate.

13. The method of claim 8 further comprising:
   depositing a non-magnetic material on the substrate between the plurality of soft magnetic rings.

14. The method of claim 8 further comprising:
   depositing a protective layer over the plurality of spaced apart hard magnetic cores and the non-magnetic material on the substrate between the plurality of soft magnetic rings.

15. A magnetic storage device, comprising:
   a magnetic bit comprising:
      a hard magnetic core with an external surface;
      a non-magnetic spacer laterally in contact with the external surface of the hard magnetic core; and
      a soft magnetic cladding surrounding the thin non-magnetic spacer;
   wherein the non-magnetic spacer and the soft magnetic cladding are configured such that the hard magnetic core and the soft magnetic cladding are operable to anti-ferromagnetically couple with each other.

16. The magnetic storage device of claim 15 wherein the soft magnetic cladding includes a soft magnetic cladding, the hard magnetic core has a circular cross section, and the soft magnetic ring has a horizontal width is between 5% and 25% of a diameter of the hard magnetic core.

17. The magnetic storage device of claim 15 wherein the hard magnetic cores are circular in cross section and less than 20 nanometers in diameter.

18. The magnetic storage device of claim 15 wherein the soft magnetic rings have a horizontal width less than 2 nanometers.

19. The magnetic storage device of claim 15 wherein the non-magnetic spacers include ruthenium (Ru).

20. The magnetic storage device of claim 15 wherein the hard magnetic core has a first perpendicular magnetization direction and the soft magnetic cladding has a perpendicular magnetization direction opposite the first direction.

* * * * *